US006252861B1

(12) United States Patent
Bernstein et al.

(10) Patent No.: US 6,252,861 B1
(45) Date of Patent: Jun. 26, 2001

(54) METHODS AND APPARATUS FOR INTERFREQUENCY HANDOFF IN A WIRELESS COMMUNICATION SYSTEM

(75) Inventors: Neil E. Bernstein, Short Hills, NJ (US); Xiao C. Bernstein, New York, NY (US); Wen-Yi Kuo, Parsippany, NJ (US); Martin H. Meyers, Montclair, NJ (US); Xiao Wang, Morristown, NJ (US); Carl F. Weaver, Hanover, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/048,626

(22) Filed: Mar. 26, 1998

(51) Int. Cl.[7] ............................................. H04Q 7/00
(52) U.S. Cl. .......................... 370/331; 370/342; 455/437; 455/443
(58) Field of Search ........................... 370/32, 329, 331, 370/332, 335, 342, 343; 455/422, 436, 438, 440, 443

(56) References Cited

U.S. PATENT DOCUMENTS

| 5,640,414 | * | 6/1997 | Blakeney, II et al. | 375/200 |
| 5,889,768 | * | 3/1999 | Storm et al. | 370/320 |
| 5,987,326 | * | 11/1999 | Tiedemann, Jr. et al. | 455/442 |
| 5,999,816 | * | 12/1999 | Tiedemann, Jr. et al. | 455/437 |

FOREIGN PATENT DOCUMENTS

| 2 313 740 | 12/1997 | (GB) . |
| 2 314 734 | 1/1998 | (GB) . |
| WO 95/12297 | 5/1995 | (WO) . |

OTHER PUBLICATIONS

E. Tiedemann and T. Chen, "Inter–Frequency Hard Handoff Improvements (Rev. 2)," Qualcomm contribution to TR45.5, TR45.5.3.1/97.03.20.02, Mar. 20, 1997.

P. Jain et al., "Proposed IS–95–B Text for Inter–Frequency Hard Handoff Improvements," Qualcomm contribution to TR45.5/97.03.20.03, Mar. 17–21, 1997.

J. Yang et al., "Design Aspects and System Evaluations of IS–95 Based CDMA Systems," IEEE International Conference on Universal Personal Communications, pp. 381–385, Oct. 1997.

\* cited by examiner

Primary Examiner—Hassan Kizou
Assistant Examiner—Ahmed Elallam
(74) Attorney, Agent, or Firm—Ryan, Mason & Lewis, LLP (57) ABSTRACT

Inter-frequency handoffs in a CDMA or other wireless communication system are controlled using a noise-limited coverage trigger metric which is able to distinguish between same-frequency cell boundaries and other-frequency cell boundaries in the system. The trigger metric may be generated as a function of an average signal-to-noise measure for pilot signals received at a mobile station of the system and a linear sum of the signal-to-noise measures. The signal-to-noise measures may be generated in the mobile station and included in messages transmitted from the mobile station to one or more base stations of the system. The trigger metric is used to control a handoff from a current frequency to a new frequency in an ongoing call. The trigger metric may alternatively be based on a measure of mobile receive power alone. Other aspects of the invention reduce unnecessary searching for a new frequency and decrease the likelihood of "ping-ponging" from a current frequency to a new frequency by providing additional checks in the handoff process. For example, receive power and pilot signal-to-noise measures may be generated at a mobile station for both current and new frequencies. The mobile station then continues to operate at the current frequency as long as certain predetermined threshold conditions based on the measures are satisfied.

24 Claims, 4 Drawing Sheets

METHODS AND APPARATUS FOR INTERFREQUENCY HANDOFF IN A WIRELESS COMMUNICATION SYSTEM

FIELD OF THE INVENTION

The present invention relates generally to wireless communication systems and more particularly to techniques for performing inter-frequency handoffs in wireless code division multiple access (CDMA) systems and other types of wireless systems.

BACKGROUND OF THE INVENTION

An important issue in IS-95 CDMA cellular and Personal Communications Service (PCS) wireless communication systems involves frequency handoffs between adjacent cells or antenna sectors. Each of the cells in such a system generally includes a base station, and the base station associated with a given cell may include an omnidirectional antenna or a multiple-sector directional antenna for communicating with mobile stations such as portable telephone handsets. As a mobile station moves throughout the system, its position relative to the system base stations changes, such that an ongoing call or other communication may need to be handed off from one base station to another, or from one antenna sector to another. Adjacent base stations and antenna sectors are typically configured to utilize different communication frequencies in order to minimize effects such as co-channel interference. Handoffs from one cell or sector to another may therefore involve changing the communication channel frequency from a current frequency to a new frequency. Such handoffs are generally referred to as inter-frequency or other-frequency handoffs.

A number of techniques have been proposed for improving the efficiency and success rate of inter-frequency handoffs in IS-95 CDMA systems. These techniques utilize messages such as Extended Handoff Direction Messages (EHDMs), Other Frequency Neighbor List Messages (OFNLMs), Other Frequency Neighbor List Response Messages (OFNLRMs) and Other Frequency Report Messages (OFRMs) to implement inter-frequency handoffs. Although proposed techniques based on these messages can reduce the number of call drops during a frequency transition, these techniques still suffer from a number of drawbacks. For example, the OFRM message is presently configured to allow a mobile station to report a signal-to-noise measure which is both "interference limited" in that it will typically decrease as the mobile moves across same-frequency cell boundaries, and "noise limited" in that it will also decrease as the mobile moves across other-frequency cell boundaries. For a measure which is interference limited, interference due to signals generated by other cells is greater than the noise level, while for a measure which is noise limited, the noise level is greater than the interference due to signals generated by other cells. A same-frequency cell boundary may be defined by a set of points at which the strength of a pilot signal from one cell exceeds that of a pilot signal from an adjacent cell, where both the pilot signals are at the same frequency. An other-frequency cell boundary may be defined as a set of points at which a signal from one cell at a designated frequency exceeds the strength of a signal from an adjacent cell at another frequency by a specified number of decibels. An OFRM message which utilizes conventional signal-to-noise measures cannot be used to distinguish same-frequency cell boundaries from other-frequency cell boundaries, and therefore does not provide an optimal trigger for inter-frequency handoffs.

In addition, the above-noted message-based techniques will often involve a base station commanding a mobile station to perform a periodic search for a new frequency as soon as the mobile station enters into a transition area near the edge of a new cell or sector. However, this periodic search tends to degrade voice quality of an ongoing call, while also reducing the speed of the search for new potential base stations at the current frequency. Moreover, in many practical applications, this periodic search for a new frequency can be unnecessary if the mobile is operating under certain types of radio frequency (RF) conditions. Yet another significant problem with the above-noted techniques is that the techniques may increase the likelihood of "ping-ponging" or rapid switching between the new frequency and the current frequency. More particularly, it may be possible in some areas of the system that both the new frequency and the current frequency will have good RF coverage, which could lead to ping-ponging if, for example, the mobile station reports the received power and signal-to-noise measure for only the new frequency.

SUMMARY OF THE INVENTION

The invention provides methods and apparatus for improving inter-frequency handoffs in CDMA and other types of wireless communication systems. In accordance with a first aspect of the invention, a noise-limited coverage trigger is provided which may be used to distinguish between same-frequency cell boundaries, which are generally interference limited, and other-frequency cell boundaries, which are generally noise limited. The coverage trigger is used to control inter-frequency handoffs, and can be implemented using signal-to-noise measurements performed in a mobile station. In an illustrative embodiment, the coverage trigger may be generated as the difference between the average transmit signal-to-noise measure for all significant pilots and the linear sum of significant pilot signal-to-noise measures reported in a Power Measurement Report Message (PMRM) or Pilot Strength Measurement Message (PSMM) transmitted from the mobile station.

Alternative embodiments may utilize the mobile receive power alone as a trigger metric. For example, a measure of mobile receive power incorporated into a PSMM can be used to trigger a handoff to another frequency using a "database" approach. In this approach, when the mobile receive power in a given cell becomes small and the mobile sees primarily border cell pilots, a particular pilot is selected from a list of neighbor pilots stored in a database for that cell, and the mobile is instructed to perform a "blind" handoff to the selected pilot at the new frequency. In this manner, a mobile can be instructed to perform a handoff to a new frequency without taking any pilot Ec/Io measurements at the new frequency. The mobile receive power can also be used in the mobile to filter periodic reports. For example, the mobile may only make PSMM reports when the mobile receive power drops below a threshold, which may be specified by the current cell site.

Other aspects of the invention provide alternative techniques for controlling inter-frequency handoffs in a wireless communication system. These techniques can substantially eliminate unnecessary periodic searches in a frequency transition area, while also reducing the likelihood of ping-ponging between a current frequency and a new frequency. In an illustrative embodiment, the invention involves adding additional field parameters to an Extended Handoff Direction Message (EHDM) of an IS-95 CDMA system. The additional field parameters include one or more thresholds which ensure that a mobile station initiates a search for a new frequency, for example, only if its received power at the current frequency is lower than a certain threshold, or if a sum of signal-to-noise values for its active pilot signals at the current frequency is less than a certain threshold. The mobile can also be configured to operate such that if the received power at the new frequency does not exceed the received power at the current frequency by a designated hysteresis amount, then a search is not performed in the new frequency. The invention thus provides additional checking criteria for use in inter-frequency handoffs to ensure that unnecessary tuning and search in the new frequency are avoided.

Further improvements can be provided in inter-frequency handoffs in other illustrative embodiments of the invention. For example, a mobile station in an area in which a transition is to be made from a current frequency to a new frequency is configured to report received power and signal-to-noise values for both the new frequency and the current frequency. If these values indicate that the mobile station is operating under acceptable RF conditions at the current frequency, there is no need to perform an inter-frequency handoff. This aspect of the invention can substantially reduce the likelihood of ping-ponging between the current and new frequencies, as compared to the conventional inter-frequency handoff techniques noted above.

DETAILED DESCRIPTION OF THE INVENTION

The present invention will be illustrated below in conjunction with an exemplary IS-95 code division multiple access (CDMA) wireless communication system. It should be understood, however, that the invention is not limited to use with any particular type of communication system, but is instead more generally applicable to any wireless system in which it is desirable to provide improved performance for frequency handoffs. For example, although the techniques are illustrated with reference to the IS-95 CDMA cellular and personal communications service (PCS) systems, it will be apparent to those skilled in the art that the techniques are also applicable to other CDMA systems, as well as to other types of wideband and narrowband wireless systems. The term "primary base station" as used herein refers generally to a base station communicating directly with a given mobile station, such as the base station handling an on-going call for the mobile station. The term "current frequency" refers generally to the channel frequency used by a mobile station for an ongoing call or other communication. The term "new frequency" refers to a potential channel frequency to which an ongoing call or other communication may be handed off as the mobile station moves within the wireless system.

Figure 1:
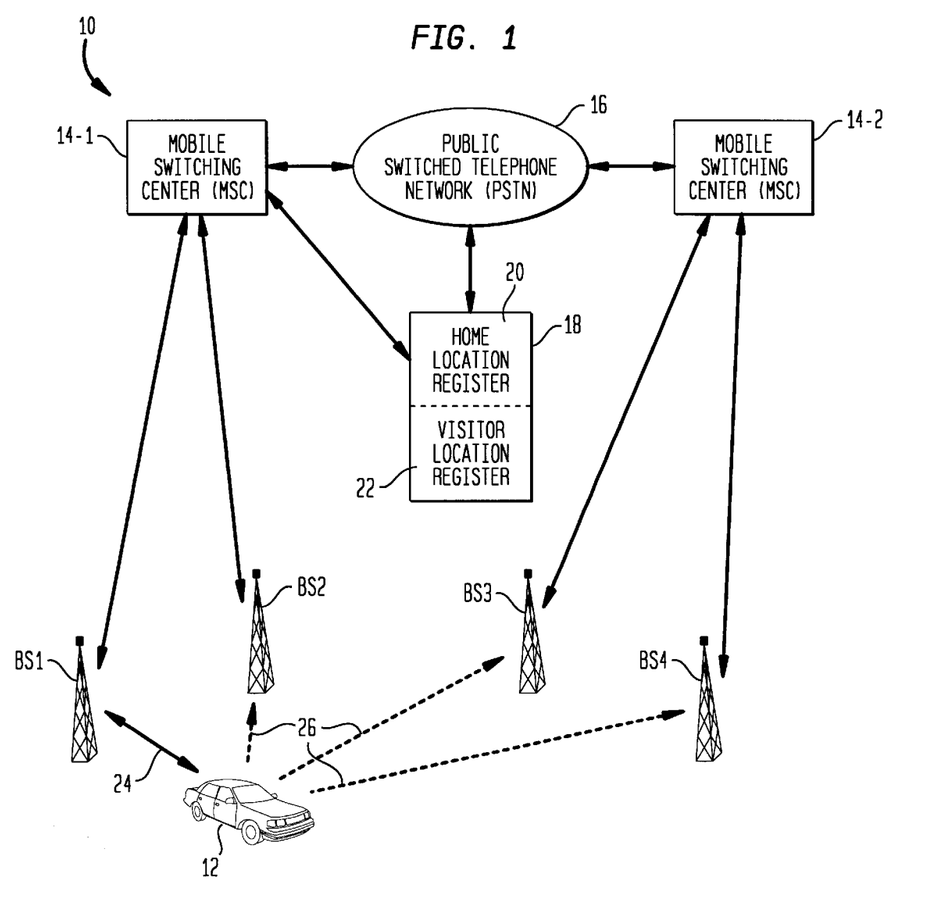
FIG. 1 shows an exemplary code division multiple access (CDMA) wireless communication system in which inter-frequency handoffs in accordance with the invention may be implemented.

FIG. 1 shows an exemplary cellular or PCS system 10. The system 10 is configured in accordance with TIA/EIA/IS-95A, "Mobile Station—Base Station Compatibility Standard for Dual-Mode Wideband Spread Spectrum Cellular System," June 1996, and ANSI J-STD-008, "personal Station—Base Station Compatibility Requirements for 1.8 to 2.0GHz Code Division Multiple Access (CDMA) Personal Communication Systems," both of which are incorporated by reference herein The system 10 includes a mobile station (MS) 12 and a number of base stations BS1, BS2, BS3 and BS4. The base station BS1 of FIG. 1 represents a primary base station, communicating with mobile station 12 via the path designated by solid two-way arrow 24, while the surrounding base stations BS2, BS3 and BS4 may serve as secondary base stations which can detect signals transmitted via the paths indicated by dashed one-way arrows 26. The primary base station BS1 communicates with the mobile station 12 using CDMA techniques described in the above-cited standards documents. As the mobile station 12 moves within the system 10, handoffs occur, such that base stations other than BS1 become primary base stations for communicating with the mobile station 12. The system 10 in this illustrative embodiment also includes first and second mobile switching centers (MSCs) 14-1 and 14-2. A given MSC typically connects several BSs with a public switched telephone network (PSTN) 16. For example, MSC 14-1 connects base stations BS1 and BS2 with the PSTN 16 and MSC 14-2 corrects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

Figure 2:
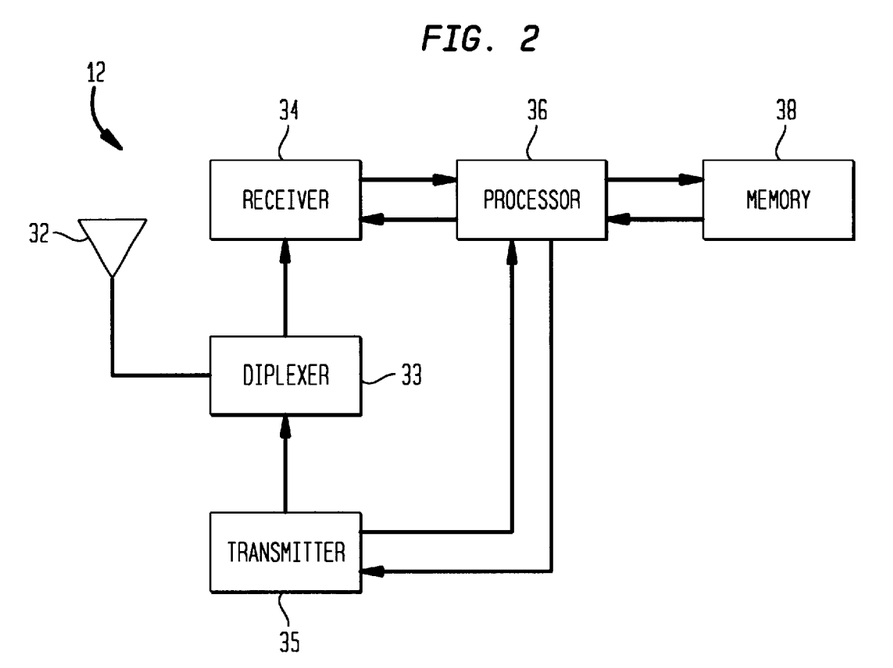
FIG. 2 is a block diagram showing an exemplary mobile station which can perform inter-frequency handoffs in accordance with the invention.

FIG. 2 shows a more detailed view of the mobile station 12. The mobile station 12 includes an antenna 32 which receives signals from and transmits signals to base stations of the system 10. A receive signal is directed by a diplexer filter 33 to an input of a receiver 34 which may implement conventional downconversion, demodulation, digital-to-analog conversion and other processing of the receive signal. A transmitter 35 performs complementary operations such as analog-to-digital conversion, modulation and upconversion to generate a transmit signal which is directed via diplexer 33 to the antenna 32 for transmission. A processor 36 is coupled to both the receiver 34 and the transmitter 35. The processor 36 operates in conjunction with a memory 38 to control the communication functions of the mobile station 12. For example, data or other information in messages which are part of a receive signal may be supplied to processor 36 such that processor 36 can implement the process steps to be described in conjunction with FIGS. 3A and 3B below. The processor 36 may also perform receive signal power and signal-to-noise measurements, and generate messages which are incorporated into the transmit signal for transmission to one or more base stations.

A first aspect of the invention relates to a noise-limited coverage trigger which, unlike conventional inter-frequency handoff triggers, may be used to distinguish between "interference-limited" same-frequency cell boundaries, and "noise-limited" other-frequency cell boundaries. The coverage trigger is used to control inter-frequency handoffs, and can be implemented using signal-to-noise measurements performed in a mobile station. As will be described in greater detail below, an exemplary coverage trigger in accordance with the invention may be generated as the difference between the average transmit signal-to-noise measure for all significant pilots and the linear sum of significant pilot signal-to-noise measures reported in otherwise conventional Power Measurement Report Message (PMRM) or Pilot Strength Measurement Message (PSMM)

transmitted from the mobile station. For example, an exemplary trigger metric Tn in accordance with the invention may be defined as:

$$Tn = Fe - Es$$

where Fe is the average transmit Ec/Io value in dB for all significant pilots, and Es is the linear sum of all significant pilot Ec/Io values reported in the PMRM or PSMM messages from the mobile station. The term "significant pilots" refers generally to pilots which are no less than X dB below the largest pilot as measured at the mobile, where X may be approximately six or another suitable value. An Ec/Io value for a given pilot is a measure of the ratio of signal energy to interference plus noise at the pilot frequency. A typical handoff threshold for Tn might be between about 3 dB and 5 dB.

This portion of the description will utilize the notational convention that values expressed in logarithmic quantities (i.e., dB) begin with an upper case character, while values expressed in linear quantities begin with a lower case character. For example, the average fraction $fe$ of transmit power in the pilots may be expressed as $fe = 10^{Fe/10}$. The fraction $fe$ is given by:

$$fe = \Sigma(e)/\Sigma(e./f)$$

where e is a sorted (1, n) vector containing all Ec/Io values for the significant pilots, $f$ is a (1, n) vector of all transmit Ec/Io values corresponding to the elements of e, n is the number of significant pilots as seen from the mobile station, and e./$f$ is an operation which divides each element of e by the corresponding element in $f$. If e and $f$ have a length of 1 then $fe=f$. The vector $f$ of transmit Ec/Io values may be expressed as:

$$f = gp^2/(gp^2 + ga^2 + gs^2 + \Sigma(gv^2))$$

where gp is a (1, n) vector of pilot gain settings for each cell site corresponding to the elements of e, ga and gs are (1, n) vectors of page and sync channels in digital gain units (DGUs), gv is an (m, n) matrix of voice channel gains, and Σ() applied to an (m, n) matrix sums the columns to yield a (1, n) vector. The above-noted linear sum of Ec/Io values is then given by:

$$es = \Sigma(e).$$

The computation of the trigger metric Tn can be repeated periodically, such as about every two to five seconds, when the mobile station is in a frequency transition area. The computed metric is used to determine whether an inter-frequency handoff should take place. For example, a trigger metric having a value which exceeds a threshold may be used to indicate the need for a particular inter-frequency handoff. Unlike conventional handoff triggers, the above-described trigger is able to distinguish same-frequency cell boundaries from other-frequency cell boundaries, and is therefore particularly well suited for use in controlling inter-frequency handoffs.

Alternative embodiments of the invention may utilize a handoff trigger which is based on mobile receive power alone. For example, a measure of mobile receive power incorporated into a PSMM can be used to trigger a handoff to another frequency using an approach based on neighbor information stored in a database. A handoff which utilizes this approach may be initiated when the mobile receive power in a given cell becomes small and the mobile sees primarily border cell pilots. A border cell may be characterized as a cell which is missing some neighbors on the same frequency. A particular pilot is selected from a list of neighbor pilots stored in a database for the given cell, and the mobile is instructed to perform a "blind" handoff to the selected pilot at the new frequency. In this manner, a mobile can be instructed to perform a handoff to a new frequency without taking any pilot Ec/Io measurements at the new frequency. The mobile receive power can also be used in the mobile to filter periodic reports. For example, the mobile may only make PSMM reports when the mobile receive power drops below a threshold, which may be specified by the current cell site.

Figure 3A:
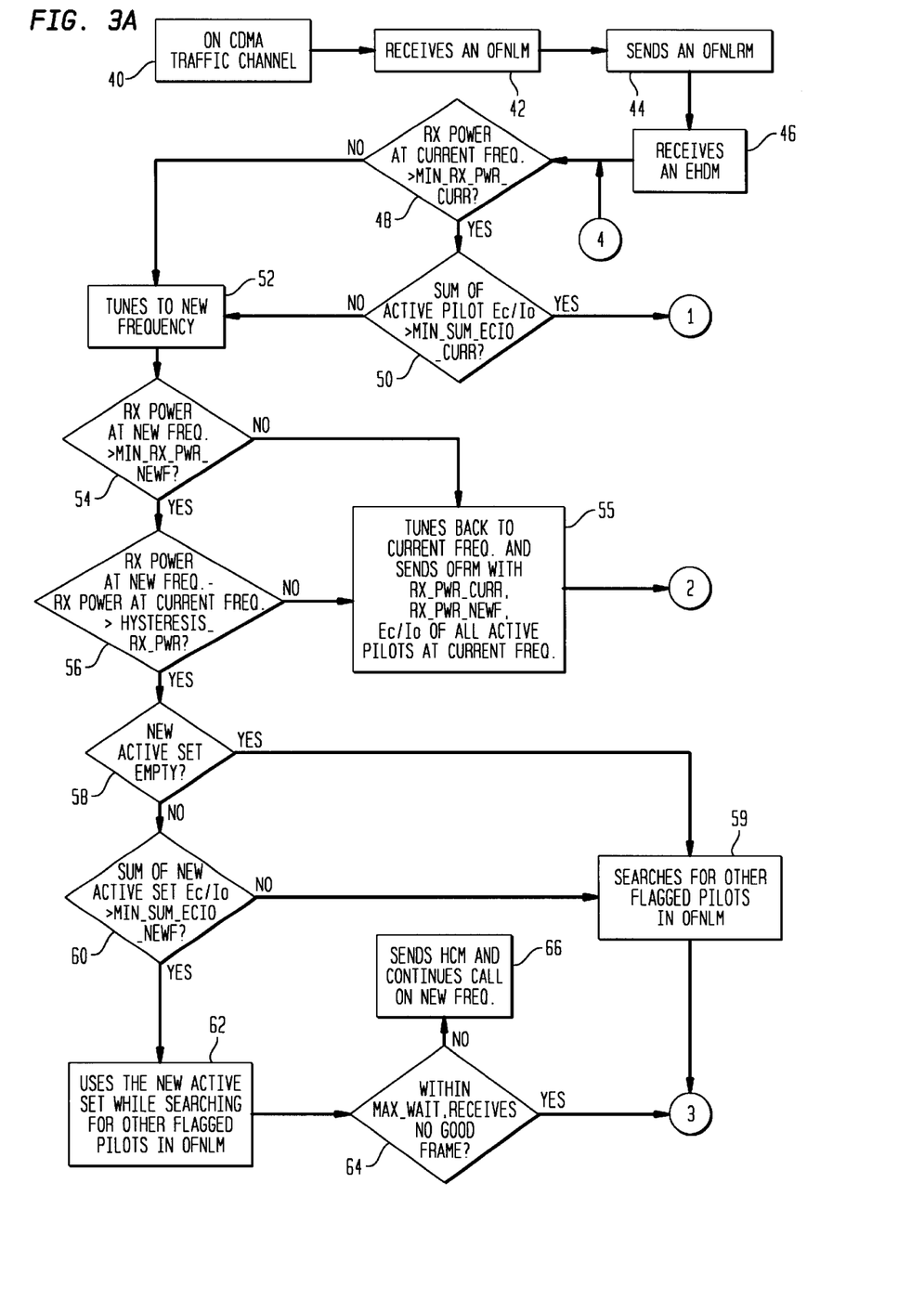
FIGS. 3A and 3B show a flow diagram illustrating a frequency handoff process which may be implemented in the mobile station of FIG. 2 in accordance with one aspect of the invention.
Figure 3B:
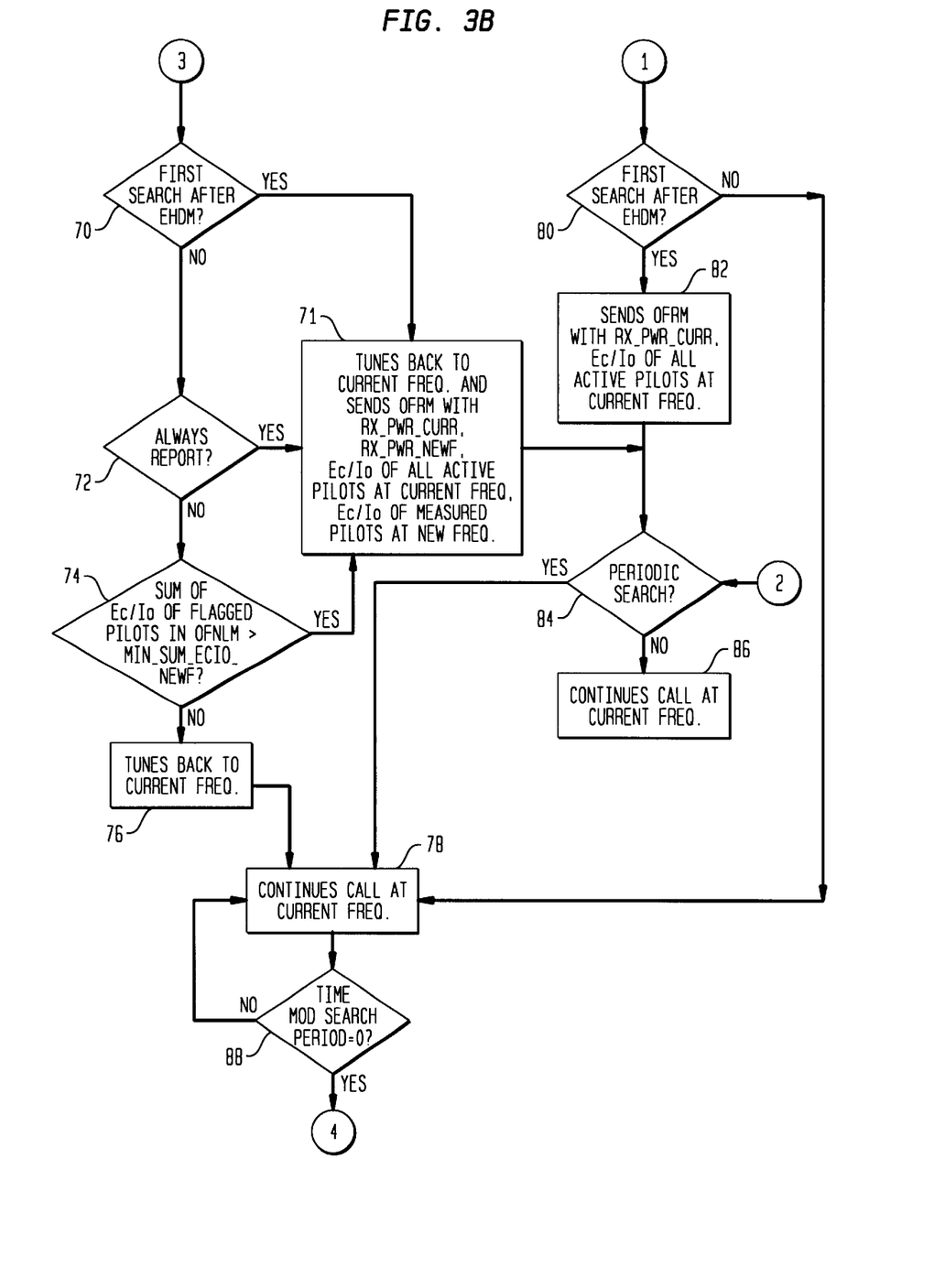

FIGS. 3A and 3B show a flow chart which illustrates an inter-frequency handoff process in accordance with another aspect of the invention, as carried out by mobile station 12 of system 10 in a frequency transition area The frequency transition area may be, for example, an area in which the mobile station 12 is approaching the vicinity of one or more base stations while maintaining an ongoing call or other communication with a primary base station. Step 40 of FIG. 3A indicates that the mobile station 12 is communicating with a base station over a CDMA traffic channel. The mobile station 12 in step 42 receives an Other Frequency Neighbor List Message (OFNLM) from a base station, in step 44 sends out an Other Frequency Neighbor List Response Message (OFNLRM) in response to the OFNLM message, and in step 46 receives an Extended Handoff Direction Message (EHDM). The OFNLM, OFNLRM and EHDM are described in detail in the above-cited IS-95 standard document, and provide information regarding inter-frequency handoff in the CDMA system 10.

In steps 48 and 50, the mobile station 12 checks whether the received power at the current frequency utilized by the CDMA traffic channel is greater than a threshold MIN_RX_PWR_CURR, and whether the sum of Ec/Io values for the active pilots is greater than a threshold MIN_SUM_ECIO_CURR. If either of these checks is not passed, the process moves to step 52 in which the mobile station tunes to a new frequency in order to explore a potential handoff opportunity. If both of the checks of steps 48 and 50 are passed, then the operation of tuning to the new frequency in step 52 is not performed since the mobile station is under acceptable RF conditions at the current frequency. Acceptable RF conditions may be defined as conditions such that the mobile received Ec/Io value is within Y dB of the transmit Ec/Io value, where Y is typically 3 or less. The checks of steps 48 and 50 help to eliminate the unnecessary tuning and searching operations typically associated with conventional inter-frequency handoff techniques.

If either of the checks of steps 48 and 50 are not passed, such that the mobile station tunes to a new frequency in step 52 to explore a potential handoff opportunity, the mobile station then in step 54 checks whether the received power at the new frequency is greater than a threshold MIN_RX_PWR_NEWF. The mobile station in step 56 also checks whether the difference between the received power at the new frequency and the received power at the current frequency is greater than a threshold HYSTERESIS_RX_PWR. This check serves to further reduce the likelihood that unnecessary tuning and searching operations will be carried out, while also reducing ping-ponging between the current and new frequencies. If either of the checks in steps 54 and 56 is not passed, then the mobile station in step 55 tunes back to the current frequency, and sends an Other Frequency Report Message (OFRM) which reports the following measurements: (1) the received power at the current frequency (RX_PWR_CURR); (2) the received power at the new frequency (RX_PWR_NEWF); and (3) the Ec/Io values of all active pilots measured at the new frequency. The Ec/Io value for a given pilot is a measure of the signal energy of that pilot to the noise plus interference at the pilot frequency. Other types of signal-to-noise measures may also be used.

If both of the checks in steps 54 and 56 are passed, then the mobile station performs a search for a new active set of frequencies and/or a neighbor list for the new frequency. In step 58, a determination is made as to whether the new active set is empty. If the new active set is empty, the mobile station searches in step 59 for other flagged pilots in the OFNLM message received in step 42. Additional details regarding this type of searching in an IS-95 CDMA system can be found in the above-cited IS-95 standard document and, for example, E. Tiedemann and T. Chen, "Inter-Frequency Hard Handoff Improvements (Rev. 2)," Qualcomm contribution to TR45.5, TR45.5.3.1/97.03.20.02, Mar. 20, 1997, and P. Jain et al., "Proposed IS-95-B Text for Inter-Frequency Hard Handoff Improvements," Qualcomm contribution to TR45.5/97.03.20.03, Mar. 17–21, 1997, which are incorporated by reference herein.

If the new active set is not empty, the mobile station in step 60 checks whether the sum of Ec/Io values for all of the active pilots in the new active set is greater than a threshold MIN_SUM_ECIO_NEWF. If the check of step 60 is not passed, the process goes to step 59 to search for other flagged pilots in the OFNLM message. If the check of step 60 is passed, the mobile station in step 62 uses the new active set while also searching for other flagged pilots in the OFNLM message. A determination is made in step 64 as to whether the mobile station has received a "good" frame within a designated waiting period MAX_WAIT. A good frame is generally one in which substantially all of the bits in the frame have been received correctly. If a good frame is received within the MAX_WAIT period, the mobile station in step 66 completes the inter-frequency handoff by sending an HCM, and continues the ongoing call on the new frequency.

If a good frame is not received within the MAX_WAIT period in step 64, or after the search for other pilots in step 59 is commenced, the process moves to step 70 of FIG. 3B. If the search for other pilots is determined in step 70 to be the first search after receipt of the EHDM in the mobile station, the mobile station in step 71 tunes back to the current frequency, and sends an OFRM which reports the following measurements: (1) the received power at the current frequency (RX_PWR_CURR); (2) the received power at the new frequency (RX_PWR_NEWF); (3) the Ec/Io values of all active pilots at the current frequency; and (4) the Ec/Io values of all active pilots at the new frequency. Providing this information in the OFRM ensures that the base station will have better control on the handoff trigger. Step 71 is also performed if an "always report" condition is determined to exist in step 72, or if the sum of the Ec/Io values of the flagged pilots in the OFNLM message is greater than a threshold MIN_SUM_ECIO_NEWF in step 74. In the "always report" condition, a flag will be set which tells the mobile to send an OFRM regardless of whether or not the sum of the new frequency pilots is above a threshold. If none of the conditions in steps 70, 72 and 74 are met, the mobile station tunes back to the current frequency in step 76, and then continues the call at the current frequency, as shown in step 78.

As noted previously, if both of the checks of steps 48 and 50 are passed, then the tuning to the new frequency in step 52 is not performed since the mobile station is under acceptable RF conditions at the current frequency. The process instead moves to step 80 of FIG. 3B. If step 80 indicates that the process is on its first search for other flagged pilots after receipt of the EHDM in the mobile station, the mobile station in step 82 sends an OFRM which reports the following measurements: (1) the received power at the current frequency (RX_WR_CURR); and (2) the Ec/Io values of all active pilots at the current frequency.

A determination is then made in step 84 as to whether periodic search is to be performed. Performance of periodic search may be specified by a flag which is set to indicate that the mobile will search the new frequency periodically without further instructions to search. If periodic search is not being performed, the mobile station continues the call at the current frequency as shown in step 86. If periodic search is being performed, the mobile station continues the call at the current frequency as shown in step 78, as long as step 88 indicates that the current time modulo the designated search period is not equal to zero. When the time modulo the search period is equal to zero in step 88, the process returns to step 48 of FIG. 3A. Step 84 and its subsequent operations are also performed if either of the checks in steps 54 and 56 is not passed, after the mobile station in step 55 tunes back to the current frequency and sends the above-noted OFRM reporting RX_PWR_CURR, RX_PWR_NEWF and the Ec/Io values of all active pilots measured at the new frequency.

The inter-frequency handoff process described above in conjunction with FIGS. 3A and 3B may be implemented by altering otherwise conventional IS-95 EHDM and OFRM to include a number of additional fields for providing the above-noted thresholds. For example, the EHDM may be modified to include the threshold MIN_RX_PWR_CURR used in step 48, the threshold MIN_SUM_ECIO_CURR used in step 50, and the threshold HYSTERESIS_RX_PWR used in step 56. The OFRM could be modified such that it includes fields for measurements such as RX_PWR_CURR, RX_PWR_NEWF, the Ec/Io values of all active pilots at the current frequency, and the Ec/Io values of all active pilots at the new frequency, as shown in step 71. The inter-frequency handoff process of FIGS. 3A and 3B can thus be implemented using simple modifications to message formats in conjunction with appropriate programming of software, firmware or hardware in processor 36 and memory 38 of the mobile station 12.

The foregoing description of the invention is intended to be illustrative only. For example, it should be noted that the EHDM, OFRM and other messages utilized in the above description are exemplary only, and the inter-frequency handoff techniques of the invention may be incorporated using other types of messages or signaling and with other types of wireless systems. In addition, the Ec/Io measurements reported by a mobile station may be replaced with other types of signal-to-noise measurements or mobile received power measurements. These and numerous other alternative embodiments within the scope of the following claims will be readily apparent to those skilled in the art.

What is claimed is:

1. A method of controlling a frequency handoff in a wireless communication system in which a mobile station communicates with one or more base stations, the method comprising the steps of:

generating a trigger metric as a function of an average transmit signal-to-noise measure for a plurality of pilot signals and a sum of the signal-to-noise measures for at least a subset of the plurality of pilot signals; and utilizing the trigger metric to control a handoff from a current frequency to a new frequency in an ongoing call.

2. The method of claim 1 wherein the generating step includes generating the trigger metric as the difference between an average transmit signal-to-noise measure for the plurality of pilot signals and a linear sum of pilot signal-to-noise measures for the plurality of pilot signals.

3. The method of claim 1 wherein the signal-to-noise measures are generated in the mobile station and included in messages transmitted from the mobile station.

4. The method of claim 3 wherein the system is an IS-95 CDMA system and the messages transmitted from the mobile station include at least one of a Power Measurement Report Message (PMRM) and a Pilot Strength Measurement Message (PSMM).

5. The method of claim 1 wherein the trigger metric is configured so as to distinguish same-frequency cell boundaries from other-frequency cell boundaries.

6. An apparatus for use in controlling frequency handoffs in a wireless communication system in which a mobile station communicates with one or more base stations, the apparatus comprising:

a processor for generating a trigger metric as a function of an average transmit signal-to-noise measure for a plurality of pilot signals and a sum of the signal-to-noise measures for at least a subset of the plurality of pilot signals; and a memory for at least temporarily storing a representation of the trigger metric, such that the trigger metric is used to control a handoff from a current frequency to a new frequency in an ongoing call in the system.

7. The apparatus of claim 6 wherein the trigger metric is generated as the difference between an average transmit signal-to-noise measure for the plurality of pilot signals and a linear sum of pilot signal-to-noise measures for the plurality of pilot signals.

8. The apparatus of claim 6 wherein the signal-to-noise measures are generated in the mobile station and included in messages transmitted from the mobile station to the one or more base stations.

9. The apparatus of claim 8 wherein the system is an IS-95 CDMA system and the messages transmitted from the mobile station include at least one of a Power Measurement Report Message (PMRM) and a Pilot Strength Measurement Message (PSMM).

10. The apparatus of claim 6 wherein the trigger metric is configured so as to distinguish same-frequency cell boundaries from other-frequency cell boundaries.

11. A method of controlling a frequency handoff in a wireless communication system in which a mobile station communicates with one or more base stations, the method comprising the steps of:

generating measures of at least one of receive power and pilot signal-to-noise for each of a current frequency and a new frequency; and utilizing at least a subset of the measures to obtain a trigger metric configured so as to distinguish same-frequency boundaries of the system from other-frequency boundaries of the system, the trigger metric being generated utilizing an average transmit signal-to-noise measure for a plurality of pilot signals and a sum of signal-to-noise measures for at least a subset of the plurality of pilot signals, the trigger metric being used to determine if an ongoing call involving the mobile station should continue to operate at the current frequency or be handed off to the new frequency.

12. The method of claim 11 wherein the generating step includes generating a measure of receive power at the current frequency, a measure of receive power at the new frequency, a sum of pilot signal-to-noise measures at the current frequency, and a sum of pilot signal-to-noise measures at the new frequency.

13. The method of claim 12 wherein the system is a CDMA system and the receive power measures and the sums of pilot signal-to-noise measures are generated in the mobile station and transmitted in an Other Frequency Report Message (OFRM) to the one or more base stations.

14. The method of claim 11 further including the step of continuing to operate at the current frequency if the receive power at the current frequency is greater than a threshold.

15. The method of claim 11 further including the step of continuing to operate at the current frequency if a sum of signal-to-noise measures at the current frequency is greater than a threshold.

16. The method of claim 11 further including the step of continuing to operate at the current frequency if a difference between the receive power at the new frequency and the receive power at the current frequency is greater than a threshold.

17. The method of claim 11 further including the step of sending one or more threshold values to the mobile station in a message transmitted from one of the base stations, wherein the threshold values are used to determine if the ongoing call involving the mobile station should continue to operate at the current frequency or be handed off to the new frequency.

18. An apparatus for controlling a frequency handoff in a wireless communication system in which a mobile station communicates with one or more base stations, the apparatus comprising:

a processor which is operative (i) to obtain measures of at least one of receive power and pilot signal-to-noise for each of a current frequency and a new frequency, and (ii) to utilize at least a subset of the measures to obtain a trigger metric configured so as to distinguish same-frequency boundaries of the system from other-frequency boundaries of the system, the trigger metric being generated utilizing an average transmit signal-to-noise measure for a plurality of pilot signals and a sum of signal-to-noise measures for at least a subset of the plurality of pilot signals, the trigger metric being used to determine if an ongoing call involving the mobile station should continue to operate at the current frequency or be handed off to the new frequency; and a memory for at least temporarily storing one or more thresholds for use by the processor in determining if the ongoing call should continue at the current frequency or be handed off to the new frequency.

19. The apparatus of claim 18 wherein the measures obtained by the processor include a measure of receive power at the current frequency, a measure of receive power at the new frequency, a sum of pilot signal-to-noise measures at the current frequency, and a sum of pilot signal-to-noise measures at the new frequency.

20. The apparatus of claim 19 wherein the system is a CDMA system and the receive power measures and the sums of pilot signal-to-noise measures are generated in the mobile station and transmitted in an Other Frequency Report Message (OFRM) to the one or more base stations.

21. The apparatus of claim 18 wherein the ongoing call continues to operate at the current frequency if the receive power at the current frequency is greater than a threshold.

22. The apparatus of claim 18 wherein the ongoing call continues to operate at the current frequency if a sum of signal-to-noise measures at the current frequency is greater than a threshold.

23. The apparatus of claim 18 wherein the ongoing call continues to operate at the current frequency if a difference between the receive power at the new frequency and the receive power at the current frequency is greater than a threshold.

24. The apparatus of claim 18 wherein the one or more threshold values are supplied to the mobile station in a message transmitted from one of the base stations.

* * * * *